Aug. 21, 1962 J. AWRAMIK, JR., ETAL 3,050,249

RADIO INTERFERENCE CALCULATOR

Filed Nov. 24, 1958 5 Sheets-Sheet 1

INVENTORS
JOSEPH AWRAMIC, JR.
WAYNE M. JEWETT.

BY Richard C. Reed
ATTORNEY

RADIO INTERFERENCE CALCULATOR

Filed Nov. 24, 1958 5 Sheets-Sheet 2

INVENTORS
JOSEPH AWRAMIC, JR.
WAYNE M. JEWETT.

BY

ATTORNEY

Aug. 21, 1962 J. AWRAMIK, JR., ETAL 3,050,249

RADIO INTERFERENCE CALCULATOR

Filed Nov. 24, 1958 5 Sheets-Sheet 3

INVENTORS
JOSEPH AWRAMIC, JR.
WAYNE M. JEWETT.

BY Richard C. Reed
ATTORNEY

Aug. 21, 1962 J. AWRAMIK, JR., ETAL 3,050,249

RADIO INTERFERENCE CALCULATOR

Filed Nov. 24, 1958 5 Sheets-Sheet 4

INVENTORS
JOSEPH AWRAMIC, JR
WAYNE M. JEWETT.

BY Richard C. Reed
ATTORNEY

INVENTORS
JOSEPH AWRAMIC, JR.
WAYNE M. JEWETT.

BY Richard C. Reed
ATTORNEY

United States Patent Office 3,050,249

Patented Aug. 21, 1962

3,050,249

RADIO INTERFERENCE CALCULATOR

Joseph Awramik, Jr., Oxon Hill, Md. (4239 Oak Lane SE., Washington 22, D.C.), and Wayne M. Jewett, Oxon Hill, Md. (5012 Lindsay Road, Washington 21, D.C.)

Filed Nov. 24, 1958, Ser. No. 776,151
5 Claims. (Cl. 235—78)
(Granted under Title 35, U.S. Code (1952), sec. 266)

The invention described herein may be manufactured and used by or for the Government of the United States of America for governmental purposes without the payment of any royalties thereon or therefor.

This invention relates in general to a calculating device and in particular to a device for calculating radio interferences and selecting channels for interference-free operation.

The vulnerability of radio communication systems to interferences in areas of high density system utilization is an increasingly serious problem. In attempting to select operating channel frequencies in such areas, so as to provide mutually interference-free operation when all selected channels are used simultaneously, one must give consideration to the many factors which may be serious potential causes of interference. Some sources of interference, such as receiver local oscillator radiation and conducted noise on power lines, are a result of poor design or faulty equipment installation. Interferences in this category can usually be reduced to negligible proportions with techniques well known to the art. Other interferences such as receiver cross-modulation, intermodulation products, and spot interferences caused by receiver spurious responses and transmitter spurious emissions, cannot be readily disposed of, even with the best of equipment design. Interference due to cross-modulation can be circumvented by spacing adjacent channels with a greater separation than that required to avoid cross-modulation of an acceptable amount. Since spot interferences are determined by the characteristics of specific equipments used, the information necessary to avoid these types of interferences is, in many cases, available from the results of laboratory equipment evaluations, or the information can be obtained from additional tests if not already available, and in any event the solution to the spot-interference problem is indicated by means known to the art. On the other hand, extremely large numbers of intermodulation products can be generated as the result of numerous combinations of a multiplicity of intermodulating frequencies, and it will be shown in the teachings of this specification that the solution of the interference problem resides principally in the avoidance of intermodulation products whose frequencies coincide with or fall near the channels which may be selected from a discrete band of frequencies from which selections of mutually interference-free channels are to be made.

Intermodulation products, resulting from the coupling of energies of two or more signals in a common, non-linear impedance device, fall in two broad categories: even-order products and odd-order products, each having families of several types. In the practical case, such as exemplified by the 225 mc. to 400 mc. VHF/UHF band, most of the even-order intermodulation products generated, of any significant amplitude, fall outside the discrete band of frequencies from which channel assignments may be made, and the interference effects of these products can be reduced to negligible proportions by such well known techniques as band limiting filters. Even-order intermodulation products falling inside the band are generated from the interaction of frequencies so widely separated that the products in most practical cases are of negligible amplitude and usually need not be considered as sources of interference in the band.

Many of the odd-order intermodulation products also fall outside the discrete band of frequencies from which channel assignments may be made, and the same argument applies here as for the even-order products falling outside the band. However, the odd-order products which may fall within the band constitute an extremely large number of possible potential interferences. To avoid odd-order products is very difficult because of the large number of products that are formed. For example, considering only third-order intermodulation products of the types having a likelihood of falling near or within the discrete band from which selections of mutually interference-free channels may be made, products of the types characterized by the expressions $2A-B$ and $A+B-C$, the total number (T) of such products formed by $n$ intermodulating frequencies is given by the expression:

$$T=\frac{n^2(n-1)}{2}$$

(As used throughout this specification, A, B, C, D, etc. are channel radio frequencies. The order of the intermodulation products is given by the arithmetical sums of the coefficients, viz.: $2A-B$, third order; $3A-2B$, fifth order; $2A+B-2C$, fifth order, etc.)

Moreover, if $n$ channels have been found in some manner which permit interference-free operation, and it is desired to add an $(n+1)$th channel, several trials may be required to find a suitable one. If, for every trial channel, each third-order intermodulation product of type $2A-B$ and $A+B-C$ had to be evaluated, the number of such evaluations T′ would be given by:

$$T'=p\cdot\frac{n(3n+1)}{2}$$

where, $p$=number of trial channels used in finding a suitable channel.

Furthermore, the number of different combinations ($N^Cn$) from N channels, taking $n$ channels at a time is given by:

$$N^Cn=\frac{N!}{n!(N-n)!}$$

The number of available channels from which to make a selection, in a practical case, is of the order of $N=108$, $N=212$, or $N=1750$. The number of possible combinations of even a modest number taken at a time ($n=10$) results in a very large number of combinations ($3.88\times10^{13}$ for $N=108$; $7.25\times10^{25}$ for $N=1750$). Add to this the combinaitons produced as a result of varying $n$ over a limited range, say from $n=5$ to $n=15$, or of increasing the value of N, and the number of combinations is truly astronomical.

Each combination, of course, is accompanied by hundreds, or thousands of third-order intermodulation products, depending on the number of channels ($n$) under consideration; and the problem of selecting $(n+1)$th channels adds further to the complexity.

As has been shown, extremely large numbers of potentially interfering intermodulation products can be generated, not only because of the large number of intermodulation products formed as a result of any one combination of a multiplicity of intermodulating frequencies, but also because a large number of combinations can be formed from the frequencies available for channel assignments.

It can be shown in a similar manner that the number of fifth-order intermodulation products is much greater than the number of third-order products, and the number of higher odd-order interference products is progressively greater the higher the order.

Thus, unless an adequate device is provided, the task of selecting even a modest number (10 to 20) of mutually interference-free channels can be very difficult.

Accordingly, an object of the present invention is to provide a device for selecting an optimum number of mutually interference-free channels in a band of operation.

Another object is the provision of a calculator that keeps a record of channels "accepted" and a cumulative record of the frequency intervals between channels as they are successively "accepted" in the family of mutually interference-free channels.

Another object of the invention is to provide a device for determining the number of signals and the spacing of the signal frequencies producing an odd-order intermodulation product.

Another object of the present invention is the provision of a calculator that permits ready determination of whether inclusion of a proposed channel will create an interference condition from the formation of odd-order intermodulaiton products of the type $2A-B$, $3A-2B$, $4A-3B$, etc., or of the types $A+B-C$, $2A+B-2C$, $3A+B-3C$, etc.

Another object of the present invention is the provision of a calculator that permits ready determination of the order of the intermodulation interference that would be produced by the inclusion of a proposed channel.

Another object of the present invention is the provision of a calculator that permits ready determination of whether inclusion of a proposed channel will create an interference condition due to cross-modulation.

Another object of the present invention is the provision of a calculator that permits ready determination of whether inclusion of a proposed channel will create an interference condition due to certain types of receiver spurious responses.

Another object of the present invention is the provision of a calculator that permits ready determination of the frequency of all second-order intermodulation products equal to the difference of intermodulating frequencies.

The exact nature of this invention as well as other objects and advantages thereof will be readily apparent from consideration of the following specification relating to the annexed drawings in which:

FIG. 1 presents Table I entitled "Distribution of Third-Order Products of Three Signals," and Table II entitled, "Distribution of Fifth-Order Products of Three Signals."

Figure 1:
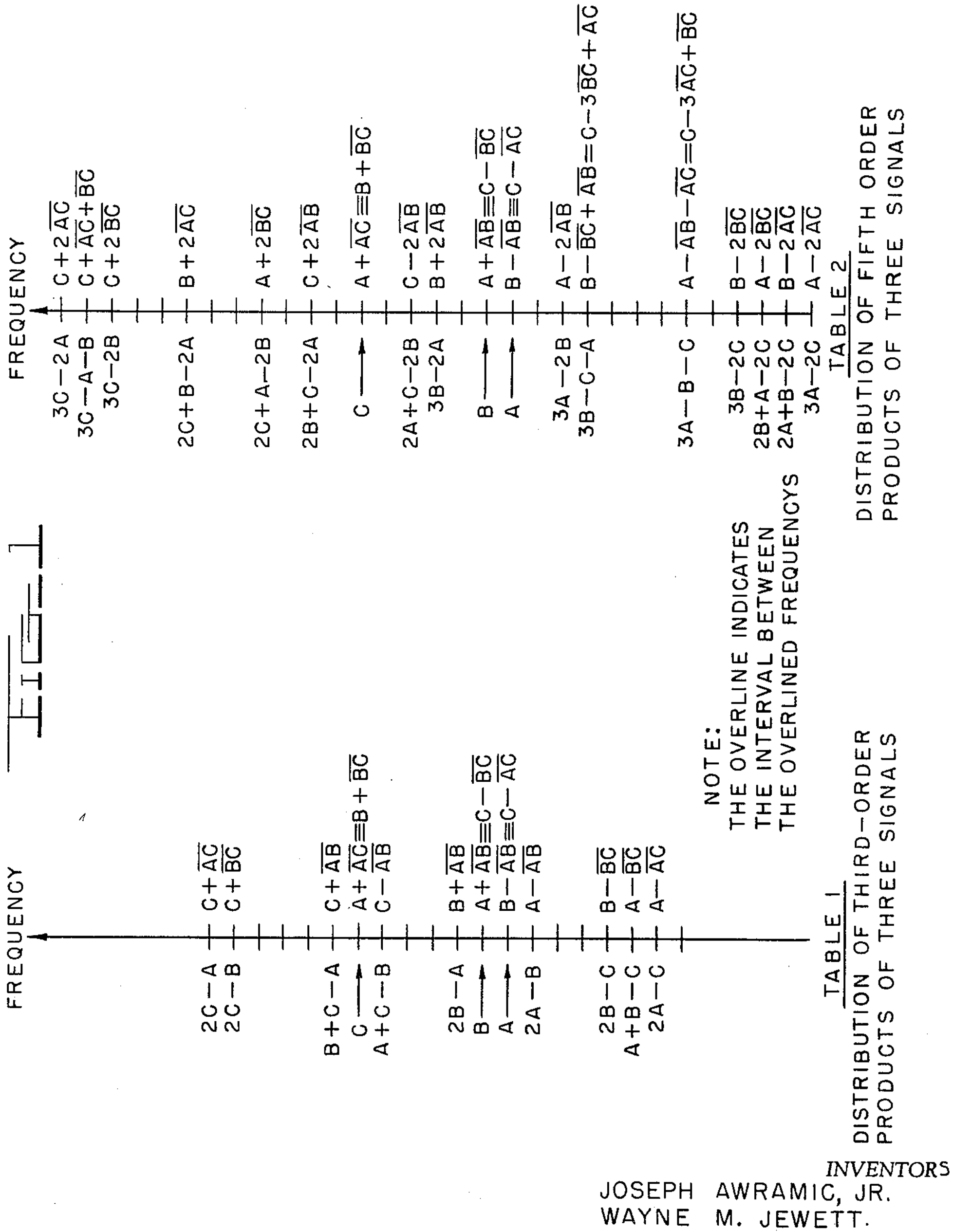
Figures 4, 5:
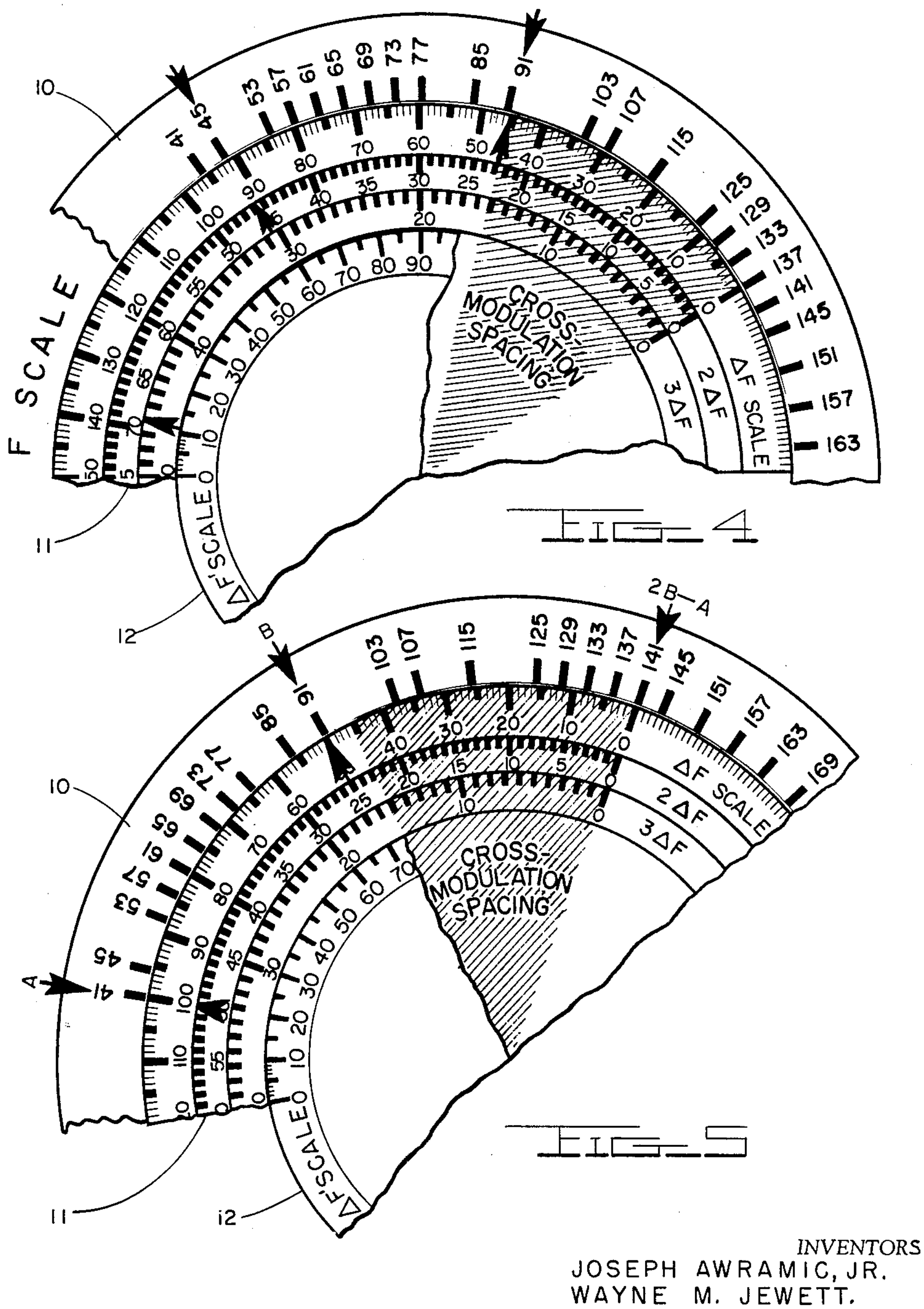

FIG. 4, when considered with FIG. 1, illustrates an operation of the calculator whereby successive mutually interference-free channels may be selected.

Figure 6:
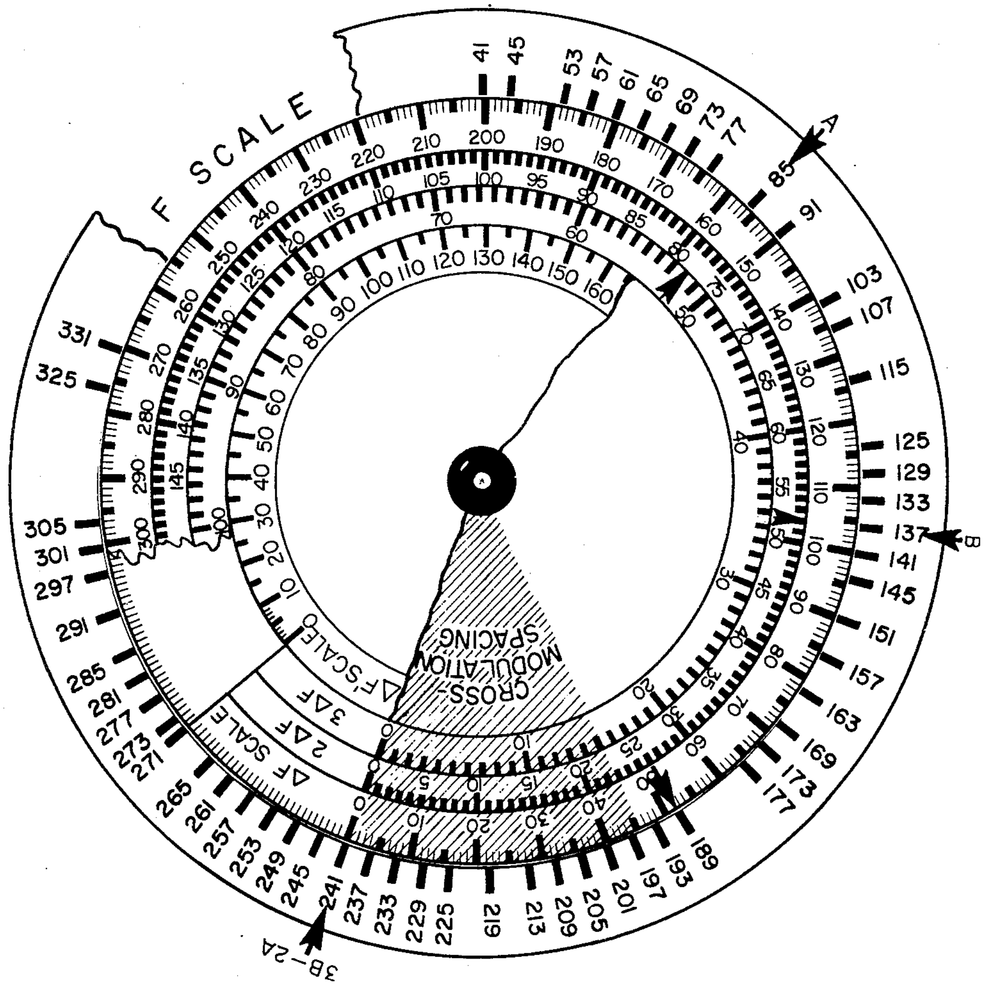

FIGS. 5 and 6 illustrate manipulations of the calculator used to determine the number of signals and the spacing of the signal frequencies producing an odd-order intermodulation product.

Figure 7:
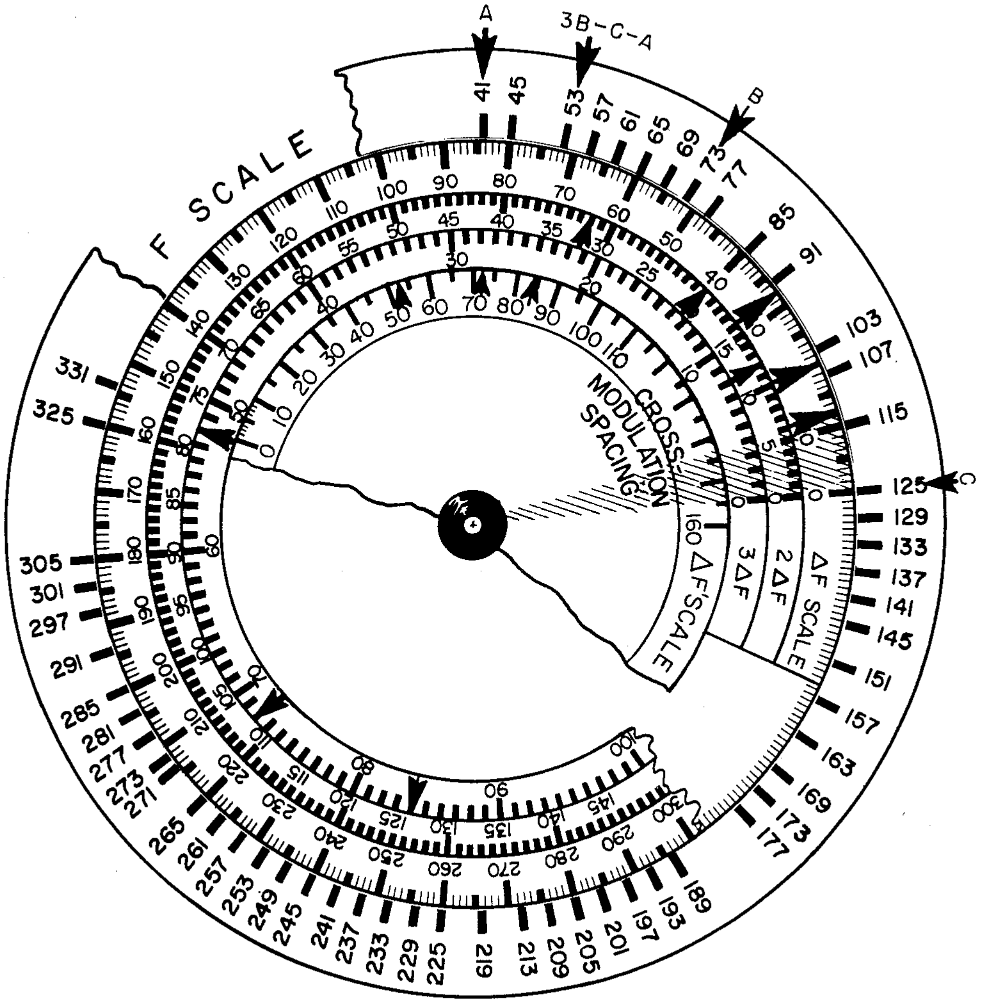

FIG. 7 illustrates manipulations of the calculator used to determine the possibility of interferences due to fifth-order intermodulation products of the type $3A-B-C$.

A calculator, constructed in accordance with the teachings of the present invention, is founded on a principle of differences, which may be expressed generally as follows: The frequency of any intermodulation product resulting from the interaction of a multiplicity of intermodulating frequencies can be expressed as a linear function in terms of one of the intermodulating frequencies and one or more of the intervals (differences) between the intermodulating frequencies.

The application of the principle set forth above becomes simplified if consideration is limited to those products which fall within or near a discrete band of frequencies from which an attempt to select mutually interference-free channels is to be made. For example, in the case of third-order intermodulation products, the principle reduces to the following statement: The frequency of an intermodulation product can be defined in terms of one of the frequencies plus or minus one of the intervals between the frequencies which generate the intermodulation products. In FIG. 1, Table I shows all the third-order products of interest for three intermodulating frequencies A, B and C to the left of the linear scale which indicates frequency. To the right of this scale is shown how each of these intermodulation products is equivalent to an original intermodulating frequency plus or minus some interval between intermodulating frequencies. Also shown as identities are other terms to complete the number of all possible sum and difference combinations of all intervals between the original intermodulating frequencies.

These intermodulation products fall in a definite pattern about the intermodulating frequencies causing them. It should be observed that two-signal interference products ($2A-B$ type) are symmetrically disposed about the intermodulating frequencies, and are spaced from them by the interval $B-A$. Thus interference may be produced in two receivers when two intervals between three channel frequencies are equal. The converse, that no third-order intermodulation product interference of types $2A-B$ or $A+B-C$, will take place if no channel intervals are alike, is also true. Since any number of intermodulating frequencies can be examined in all possible combinations of frequencies, taken two or three at a time, the third-order intermodulation case can be summerized as follows: No third-order intermodulation products, of types $2A-B$ or $A+B-C$, will coincide in frequency with any of any number of intermodulating frequencies producing them, provided no frequency interval between the intermodulating frequencies is equal to any other frequency interval between them.

A table similarly constructed for fifth-order intermodulation products, Table II in FIG. 1, shows that intermodulation products of the types $3A-2B$ and $2A+B-2C$, the more serious potential interferences of the fifth-order products, are defined in terms of one of the intermodulating frequencies, plus or minus twice some interval between intermodulating frequencies. Thus to avoid these products, no interval between accepted channels must be equal to twice an interval between accepted channels. Also, it may be noted in Table II that the fifth-order products of type $3A-B-C$ may be expressed in terms of one of the frequencies involved in the generation of the product and two of the intervals (differences) between intermodulating frequencies. Furthermore, that these products may be defined in terms of the frequency C, where $A<B<C$, and the two intervals involving C. For example, $$3B-C-A=B-\overline{BC}+\overline{AB}=C-3\overline{BC}+\overline{AC}.$$

Thus, where C is the channel being considered, the frequency of these products may be determined, for all combinations of three frequencies which include C, by considering in the above equation all combinations of the intervals involving C. To avoid seventh-order products of the types $4A-3B$ and $3A+B-3C$ the interval between accepted channels may not be equal to three times an interval between accepted channels. Higher order intermodulation products of these general types have similar relationships to the frequencies forming them. Thus, the addition of a $4\Delta F$ scale in the calculator shown in FIG. 1 would permit determination of ninth-order interference possibilities.

Figure 2:
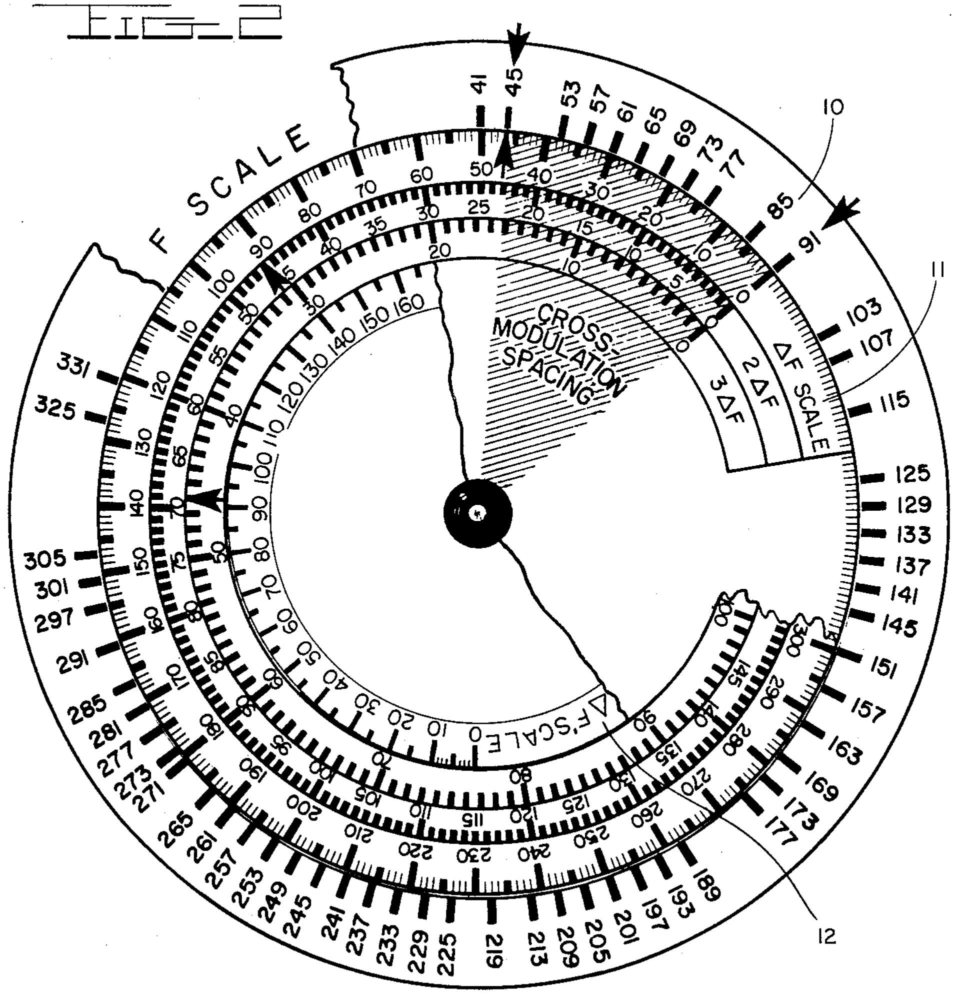
FIG. 2 is a plan view of the calculator.
Figure 3:
FIG. 3 is a side view of the calculator.

Referring to FIGS. 2 and 3, base 10, which may be circular in form, is circumferentially graduated clockwise from 0 to 360° with scale F. Each of the indicia of scale F represents a channel having a predetermined frequency that may be selected for transmission in a band of operation. The width of the indicia indicates the channel bandwidth. For example, if the carrier frequencies of channels 1, 2 and 3 are 225.0 mc., 225.2 mc., and 225.4 mc., respectively, then each indicium on the F-scale represents a 200 kc. bandwidth. Disc 11, which also may be circular in form and smaller in diameter than base 10, is concentrically, rotatably mounted on the base and concentrically, circularly graduated from 360 to 0°, i.e., counterclockwise with three scales marked ΔF, 2ΔF, and 3ΔF. The F and ΔF-scales have a one to one ratio. For the same angular distance on the ΔF-scale, the reading on the 2ΔF-scale is one-half that of the ΔF-scale, and the reading on the 3ΔF-scale is one-third that of the ΔF-scale. The cross-hatched sector indicated as "cross-modulation spacing" is laid off from the 0 indicium on the ΔF-scale with an arc having a length dependent upon the spacing required between adjacent, selected channels to avoid excessive cross-modulation. If, for example, the indicia on base 10 represent channels of 200 kc. bandwidth having center frequencies from 225 to 400 mc., to avoid excessive cross-modulation, in the example depicted, selected channels for certain equipments should be spaced by at least 9 mc. For these conditions, the distance from 0 to 45 on the ΔF-scale would be marked to indicate the minimum frequency interval between acceptable channels. Disc 12, which also may be circular in form and smaller in diameter than the 3ΔF-scale on disc 11, is concentrically, rotatably mounted on the base and circularly graduated from 0 to 360°, i.e., clockwise with a scale marked ΔF'. The ΔF and ΔF'-scales have a one to one ratio. In order to facilitate marking and storing of information in the manner indicated in the examples given below, base 10, disc 11 and disc 12 may each be provided with a transparent plastic overlay, or a movable rotatable transparent cursor, not shown, may be added to facilitate alignment of indicia.

It is understood that the arrangement described above is only one embodiment and that a calculator constructed in accordance with the teachings of the present invention could take one of several mechanical forms. If for example, the VHF/UHF band were to be represented with adequate resolution to depict 200 kc. or 100 kc. channel spacing, the calculator could be provided with scales on perforated tape using two indexing wheels in combination with storage and take-up reels. Mesh spiral scales could also be used. For the VHF/UHF band a circular calculator having a 9 inch diameter is adequate to give resolution of 200 kc.=0.4 degree, which on the periphery of a 9" diameter circle is 1/32".

The calculator shown in FIGS. 2 and 3 may be used to select interference-free channels by a process of successive selection of acceptable channels from the totality of available channels. Each channel, before acceptance, is tested against a criterion of acceptability before proceeding to the next trial selection. The criteria are: (1) that operation of previously accepted channels will not cause interference on the trial channel, and (2) that operation on the trial channel, of itself, or in combination with any number of previously accepted channels, will not interfere with operation on any of the previously accepted channels. If these conditions are met, the trial channel is accepted and the next available channel is given consideration for acceptance. If these conditions are not met, the next trial channel is rejected and the next trial channel is tested against the criteria. This procedure is continued until available channels for further selection of acceptable channels are exhausted.

This mode of operation can be best illustrated by way of a few selected examples. It will be assumed in the first example that channels available for assignment are those numbered on the F-scale, that cross-modulation interference can be avoided if adjacent channels are not less than 9 mc. or 45 channels apart, and that channels can only be accepted on which no third-order, fifth-order, or seventh-order intermodulation products of types $2A-B$, $3A-2B$, $4A-3B$, $A+B-C$, $2A+B-2C$, or $3A+B-3C$ fall. Referring to FIG. 2, the first channel "accepted" is marked at 45 on the F-scale. Channel 91, which is the first channel spaced from channel 45 by a distance greater than the cross-modulating spacing, is "accepted" and likewise marked on the F-scale. The difference between channel 45 and 91, i.e., 46 is marked on the ΔF, 2ΔF, and 3ΔF-scales. Disc 11 is then rotated to select a third channel spaced from channel 91 by at least the cross-modulation spacing. Referring to FIG. 4, consider channel 137. Since the mark on the ΔF-scale at 46 indicates that channel 137 is separated from channel 91 by a previous value of ΔF, there is possible third-order intermodulation interference and channel 137 is rejected. Disc 11 may then be positioned to consider channel 141 by positioning the 0 indicium on the ΔF-scale opposite 141 on the F-scale. Channel 141 may be marked accepted, since none of the tentative values of ΔF, 2ΔF, or 3ΔF would equal previous values of ΔF, of 2ΔF, or of 3ΔF. This indicates that the frequency of channel 141 minus any accepted channel is not equal to a previous value of ΔF times 1/3, 1/2, 1, 2, or 3. The ΔF-scale may then be marked opposite accepted channels 45 and 91 at 50 and 96 and the 2ΔF and 3ΔF-scales may likewise be marked at 50 and 96. This procedure is continued until no further selection of acceptable channels can be made from those available.

It may be noted that the ΔF, 2ΔF and 3ΔF-scales accumulate ΔF's progressively, and that they are marked with all the ΔF's corresponding to all intervals between accepted channels. Thus, disc 11 need be moved progressively in one direction only as each channel is selected. It should further be noted that all values marked on the ΔF-scale are by definition equal to second-order products of the type $B-A$. Thus, when necessary the ΔF-scale may be marked to avoid the selection of channels which may produce a second-order product equal to a particular lower frequency signal.

As each channel is considered for acceptance, other factors bearing on its acceptability such as spot interferences could also be given consideration. For example, the primary image response of many superheterodyne receivers occur on a frequency spaced from the receiver's desired frequency by a constant interval equal to twice the receiver's intermediate frequency. Thus to avoid this type of interference, a ΔF value equal to twice the intermediate frequency should not be acceptable; and before channel selections are made, the calculator should be properly marked to indicate this information.

In some cases, if all channels having possible interference were rejected, the number available for use in a band would be inadequate. The channels on which a tolerable amount of interference is produced would then be accepted. In determining the level of interference it is desirable to evaluate the type of products and spacing between signal frequencies producing the products since these factors control in part the level of interference. For example, two-signal products ($2A-B$ type) generally have a higher amplitude and produce stronger interference than three-signal products ($A+B-C$ type). The amplitude of either type of product is determined to some extent by the spacing between the intermodulating signals.

Referring to FIG. 5, an example will be given to indicate the manner in which the number of and spacing between signals producing a third-order product can be ascertained. Assume that the channels 41 and 91 have been accepted, that the difference between the two channels, i.e., 50 has been marked on the ΔF and 2ΔF-scales, and that channel 141 is being considered for selection. It is noted that 50 on the ΔF-scale falls opposite channel 91, and that 50 on the 2ΔF-scale falls opposite channel 41. This indicates that the difference between channels 41 and 141 is twice the difference between channels 91 and 141. Referring to Table I in FIG. 1 above, the distance between A and the third-order product $2B-A$ is twice the distance between B and $2B-A$. Thus, if channel 141 is considered as the third-order intermodulation product, channel 91 as B, and channel 41 as A, it is readily seen that the third-order interference is a product of two signals, and is of the $2A-B$ type. The spacing between the frequencies of signals A and B is equal to the frequency represented by 50 digits on the ΔF-scale. If the mark on the 2ΔF-scale had not fallen opposite channel 41, the third-order interference would be the product of three signals ($A+B-C$ type).

Referring to FIG. 6, an example will illustrate the determination of the number of signals forming a fifth-order intermodulation product. Assume that channels 85 and 137 have been selected, that the difference between these channels, i.e., 52 has been marked on the ΔF, 2ΔF, and 3ΔF-scales, and that channel 241 is being considered for selection.

It is shown in Table II that for fifth-order products generated by two signals the product is spaced from one of the intermodulating signals by a distance equal to 2ΔF and from the other signal by a distance equal to 3ΔF. Since in FIG. 6 the fifth-order product, channel 241, is located a distance 2ΔF from channel 137 (signal B) and 3ΔF from channel 85 (signal A) the product is the result of two intermodulating signals and is of the $3B-2A$ type. If the 3ΔF relationship referred to above did not exist, the fifth-order interference would be a product of three signals and would be of the $2A+B-2C$ type.

Referring to FIG. 7, an example will be given to indicate the maner in which fifth-order intermodulation interference possibilities of the type $3A-B-C$ may be ascertained. In this example, the cross-modulation minimum spacing requirement is reduced to ten channels to illustrate how this factor may vary with different physical situations and to permit the example to be contained in a small sector of the calculator scale. Assume that channels 41, 53, and 73 have been accepted and that all frequency intervals between these channels have been marked on the ΔF and 2ΔF-scales. At this point, channel 125 is being considered for selection. As no frequency interval between these four channels is equal to any other frequency interval, or to twice any other frequency interval between these same four channels, there will be no possibility of third or fifth-order interference of the types previously discussed. It is desired now to determine the possibility of interference due to fifth-order products of the type $3A-B-C$. Referring to Table II in FIG. 1, it is noted that $3A-B-C$ is equal to $C-3\overline{AC}+\overline{BC}$ which in turn can be generalized as $C-3\Delta F+\Delta F'$ where ΔF' is equal to the interval between C and one of the previously accepted channels. All intervals, i.e., 52, 72, and 84, between the frequency being considered (channel 125) and all previously accepted channels should be temporarily marked on the 3ΔF and ΔF'-scales. By the alignment of the zero indicium on the ΔF'-scale with each value marked on the 3ΔF-scale, the frequency of all products equal to $C-3\Delta F+\Delta F'$ may be read on the F-scale opposite the values marked on the ΔF'-scale. In this example, when the zero indicium on the ΔF'-scale is in alignment with 52 on the 3ΔF-scale, then $\Delta F=84$ is in alignment with an accepted channel, $F=53$. Therefore, the frequency of the product expressed as $C-3\Delta F+\Delta F'$ is equal to the frequency of channel number 53. Thus, in this example, channel 125 cannot be accepted. The temporary marks placed on the 3ΔF and ΔF'-scales may be removed.

Obviously many modifications and variations of the present invention are possible in the light of the above teachings. It is, therefore, understood, that within the scope of the appended claims, the invention may be practiced otherwise than as specifically described.

In addition, it is understood that the principles of the above teachings may be applied to the use of scales for other types of intermodulation products other than those described herein, or to other problems not related to the selection of interference-free radio channels.

What is claimed is:

1. A calculator for computing frequency spacings between stations or channels of a radio network comprising a base circularly graduated clockwise to represent frequency with a linear first scale, said scale having indicia equal in width to the bandwidth of said stations, a disc concentrically located with respect to said first scale and rotatably mounted on said base, the diameter of said disc being smaller than the diameter of said first scale, said disc being concentrically, circularly graduated counterclockwise with a second scale, a third scale and a fourth scale, the diameter of said third scale being smaller than the diameter of said second scale and larger than the diameter of said fourth scale, the ratio of the indicia on said first scale to the indicia on said second scale being one to one, and the relationship of said second scale to said third scale and said fourth scale being such that for the same angular distance on said second scale the frequency variation on said third scale is one-half and the frequency variation on said fourth scale is one-third that on said second scale, said second, third and fourth scales having their origin at the same radial line, whereby three harmonically related frequency spacings from a station on said first scale may be obtained from one setting of said disc.

2. A calculator for computing frequency spacings between stations or channels of a radio network comprising a base circularly graduated clockwise to represent frequency with a linear F-scale, each indicium of said F-scale representing a channel having a predetermined frequency and each having a width dependent upon the maximum width of the intelligence band of the channel associated therewith, a disc concentrically located with respect to said F scale and rotatably mounted on said base, the diameter of said disc being smaller than the diameter of said F-scale, said disc being concentrically, circularly graduated counterclockwise with a ΔF-scale, a 2ΔF-scale, and a 3ΔF-scale, the diameter of said 2ΔF-scale being smaller than the diameter of said ΔF-scale and larger than the diameter of said 3ΔF-scale, the ratio of the indicia of said F-scale to the indicia of said ΔF-scale being one to one, and the relationship of said ΔF-scale to said 2ΔF-scale and said 3ΔF-scale being such that for the same angular distance on said ΔF-scale the frequency variation on said 2ΔF-scale is one-half and the frequency variation on said 3ΔF-scale is one-third that on said F-scale, said ΔF, 2ΔF and 3ΔF scales having their origin at the same radial line whereby three harmonically related frequency spacings from a station on said F-scale may be obtained from one setting of the disc.

3. A calculator for computing frequency spacings between stations or channels of a radio network comprising a base circularly graduated clockwise to represent frequency with a linear F-scale, each indicium of said F-scale representing a channel having a predetermined frequency and each having a width dependent upon the maximum width of the intelligence band of the channel associated therewith, a disc concentrically located with respect to said F scale and rotatably mounted on said base, the diameter of said disc being smaller than the diameter of said F-scale, said disc being concentrically, circularly graduated with a ΔF-scale, a 2ΔF-scale, and a 3ΔF-scale, the diameter of said 2ΔF-scale being smaller than the diameter of said ΔF-scale and larger than the diameter of the 3ΔF-scale, the ratio of the indicia of said F-scale to the indicia of said ΔF-scale being one to one, the relationship of said ΔF-scale to said 2ΔF-scale and said 3ΔF-scale being such that for the same angular distance on said ΔF-scale the frequency variation on said 2ΔF-scale is one-half and the frequency variation on said 3ΔF-scale is one-third that of said ΔF-scale, and a sector marked off on said disc with an arc on said ΔF-scale having a length dependent upon the spacing required between adjacent selected channels to avoid cross-modulation, said ΔF, 2ΔF, 3ΔF and said sector having their origin at the same radial line whereby three harmonically related frequency spacings from a station on said first scale may be obtained from one setting of said disc.

4. A calculator for computing frequency spacings between stations or channels of a radio network comprising a base circularly graduated clockwise to represent frequency with a linear F-scale, each indicium of said F-scale representing a channel having a predetermined frequency and having a width dependent upon the maximum width of the intelligence band of the channel associated therewith, a first disc and a second disc concentrically located with respect to said F scale and rotatably mounted on said base, the diameter of said first disc being smaller than the diameter of said F-scale and larger than the diameter of said second disc, and said first disc being circularly, concentrically graduated counter-clockwise with a ΔF-scale, a 2ΔF-scale, and a 3ΔF-scale, the diameter of the 2ΔF-scale being smaller than the ΔF-scale and larger than that of the 3ΔF-scale, said second disc being circularly graduated clockwise with a ΔF′ scale, the ratio of the indicia on said F-scale, ΔF-scale and ΔF′-scale being one to one and the relationship between the F-scale, the 2ΔF-scale, and the 3ΔF-scale being such that for the same angular distance on said F-scale the frequency variation on said 2ΔF-scale is one-half and the frequency variation on said 3ΔF-scale is one-third the frequency variation on said F-scale, said ΔF, 2ΔF and 3ΔF scales having their origin at the same radial line, whereby three harmonically related frequency spacings from a station on said F-scale or related point on said ΔF′ scale may be obtained from one setting of said first and second discs.

5. The calculator according to claim 4 including a sector marked off on said first disc with an arc on said ΔF scale extending from said radial line of origin a length dependent upon the spacing required between adjacent selected channels to avoid cross-modulation.

References Cited in the file of this patent

UNITED STATES PATENTS

| | | |
|---|---|---|
| 1,145,020 | Hill | July 6, 1915 |
| 1,435,512 | Boggio | Nov. 14, 1922 |
| 1,461,138 | Olson | July 10, 1923 |
| 2,325,761 | Fleischer | Aug. 3, 1943 |
| 2,617,591 | Kupersmit | Nov. 11, 1952 |
| 2,638,272 | Heck | May 12, 1953 |

FOREIGN PATENTS

| | | |
|---|---|---|
| 7,081 | Great Britain | Mar. 27, 1903 |
| 541,625 | Great Britain | Dec. 4, 1941 |